(12) United States Patent
Kinugawa (10) Patent No.: US 11,388,346 B2
(45) Date of Patent: Jul. 12, 2022

(54) IMAGE CAPTURING CONTROL APPARATUS AND IMAGE CAPTURING CONTROL METHOD

(71) Applicant: CANON KABUSHIKI KAISHA, Tokyo (JP)

(72) Inventor: Shogo Kinugawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/019,014

(22) Filed: Sep. 11, 2020

(65) Prior Publication Data
US 2021/0084211 A1 Mar. 18, 2021

(30) Foreign Application Priority Data

Sep. 17, 2019 (JP) .............................. JP2019-168252

(51) Int. Cl.
*H04N 5/235* (2006.01)
*H04N 5/243* (2006.01)

(52) U.S. Cl.
CPC ......... *H04N 5/2353* (2013.01); *H04N 5/2351* (2013.01); *H04N 5/243* (2013.01)

(58) Field of Classification Search
CPC .... H04N 5/2353; H04N 5/243; H04N 5/2351; H04N 5/23218; H04N 5/232
See application file for complete search history.

(56) References Cited

U.S. PATENT DOCUMENTS

| | | | | |
|---|---|---|---|---|
| 2009/0160968 A1* | 6/2009 | Prentice | ................. | H04N 5/243 348/223.1 |
| 2014/0176754 A1* | 6/2014 | Kodama | .............. | H04N 5/2353 348/222.1 |
| 2014/0286644 A1* | 9/2014 | Oshima | ................. | H04B 10/11 398/118 |
| 2015/0350555 A1* | 12/2015 | Nishi | ................... | H04N 5/3745 348/333.02 |
| 2019/0171201 A1* | 6/2019 | Tao | ...................... | H04N 5/2351 |

FOREIGN PATENT DOCUMENTS

JP 2014146979 A 8/2014

* cited by examiner

*Primary Examiner* — Gevell V Selby
(74) *Attorney, Agent, or Firm* — Canon U.S.A., Inc. IP Division

(57) ABSTRACT

An apparatus configured to control an exposure of a capturing unit includes a determination unit configured to determine an object region from a first image captured by the capturing unit and containing a predetermined object, an acquisition unit configured to acquire a region having a similar luminance value to a luminance value of the determined object region from a region other than the object region, and an adjustment unit configured to adjust the exposure of the capturing unit based on a luminance value of the region acquired by the acquisition unit in a second image captured by the capturing unit.

20 Claims, 11 Drawing Sheets

IMAGE CAPTURING CONTROL APPARATUS AND IMAGE CAPTURING CONTROL METHOD

BACKGROUND OF THE DISCLOSURE

Field of the Disclosure

The aspect of the embodiments relates to image capturing control apparatuses and image capturing control methods.

Description of the Related Art

In image capturing, a conventional camera system measures the amount of light of an entire image and controls an exposure as suitable for the measured amount of light to respond to a change in intensity of a light source.

However, in a scene in a high-contrast state where an object that occupies part of an image is backlit or excessively frontlit, it is sometimes difficult to capture an image of the object with a suitable exposure even when the exposure is controlled as suitable for the amount of light of the entire image.

The exposure setting may be set manually to capture an image of the object with a suitable exposure in the high-contrast state, but if the brightness or position of the light source is changed, the manually-set exposure setting is no longer suitable.

There is a method for setting a suitable exposure setting. In this method, an object is detected from each received captured image, and an exposure is controlled so that a luminance evaluation value of a region of the object is adjusted to a predetermined luminance evaluation value. There is also a method in which a user designates a rectangular region having a similar luminance to a luminance of an object in a background and an exposure is controlled to adjust the rectangular region to a predetermined luminance evaluation value.

Japanese Patent Laid-Open No. 2014-146979 discusses a monitoring camera system in which a feature amount of an object (target object) for which an exposure is to be adjusted is registered in advance in a database and a feature amount of a detected moving object and the registered feature amount of the object are compared for each received image. In the monitoring camera system, if it is determined that the detected moving object is the target object as a result of the comparison, an aperture, exposure, and gain are controlled (adjusted) so that the target object is adjusted to predetermined brightness.

However, since the monitoring camera system discussed in Japanese Patent Laid-Open No. 2014-146979 detects an object from each received captured image and adjusts the exposure, if the exposure is not in a suitable exposure state, it is difficult to detect the object and it may take time to adjust the exposure. In a case where a camera is situated at a passage or entrance for monitoring, the length of time an object image can be captured is short, so that an opportunity to capture an image with an appropriate exposure may be missed.

SUMMARY OF THE DISCLOSURE

According to an aspect of the embodiments, an apparatus configured to control an exposure of a capturing unit includes a determination unit configured to determine an object region from a first image captured by the capturing unit and containing a predetermined object, an acquisition unit configured to acquire a region having a similar luminance value to a luminance value of the determined object region from a region other than the object region, and an adjustment unit configured to adjust the exposure of the capturing unit based on a luminance value of the acquired region in a second image captured by the image capturing unit.

Further features of the disclosure will become apparent from the following description of exemplary embodiments with reference to the attached drawings.

DESCRIPTION OF THE EMBODIMENTS

Various exemplary embodiments of the disclosure will be described in detail below with reference to the drawings. It should be noted that the exemplary embodiments herein are not intended to limit the scope of the disclosure and that not every combination of features described in the exemplary embodiments is essential to a technical solution of the disclosure. Each configuration according to the exemplary embodiments can be modified or changed as needed depending on a specification of an apparatus to which the disclosure is applied and various conditions (use condition, use environment). The technical scope of the disclosure is defined by the claimed invention and is not limited by each exemplary embodiment described herein. Further, part of the exemplary embodiments can be combined as needed.

First Exemplary Embodiment

A camera system according to a first exemplary embodiment of the disclosure first determines an object region from a user-designated object candidate region in a first image containing a target object (object). Then, the camera system acquires a similar pixel map generated by mapping a similarity of each pixel with respect to a luminance value of the object region in the first image on a background region other than the object region in order to identify a region having a similar value to the luminance value of the object region in the first image. The camera system acquires a luminance value of a region that is acquired from the similar pixel map in a second image, which is acquired thereafter and is an exposure adjustment target, as a luminance value (luminance evaluation value) of an evaluation target. Then, the camera system adjusts (controls) the exposure so that the luminance evaluation value is adjusted to a predetermined luminance. In the present exemplary embodiment, the luminance is expressed by 256 gradations. A midpoint value of the luminance is 128, and a maximum value is 255.

<Configuration of Camera System>

Figure 1:
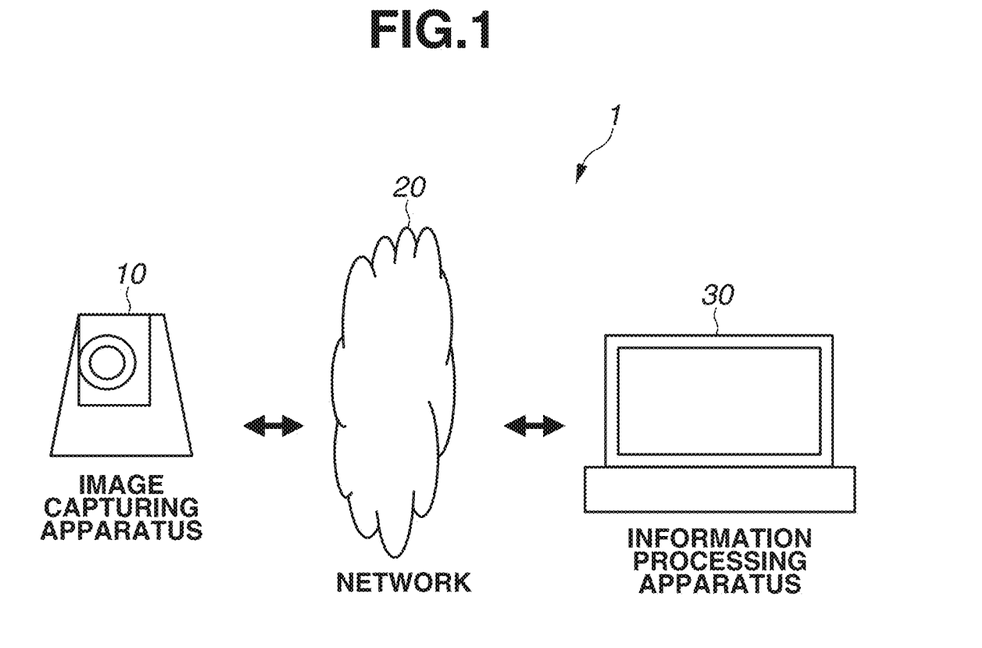
FIG. 1 is a block diagram illustrating a configuration of a camera system.

FIG. 1 is a block diagram illustrating a configuration of a camera system 1 according to the present exemplary embodiment. The camera system 1 includes an image capturing apparatus 10, a network 20, and an information processing apparatus 30. The image capturing apparatus 10 and the information processing apparatus 30 communicate via the network 20. The network 20 can be a wired or wireless network.

The image capturing apparatus 10 is an apparatus configured to capture an image (still image, moving image), and a signal (hereinafter, "image signal") of an image captured by the image capturing apparatus 10 is transmitted to the information processing apparatus 30 via the network 20. Further, the image capturing apparatus 10 receives an exposure control signal from the information processing apparatus 30 and determines/changes an exposure setting. The image capturing apparatus 10 is, for example, a network camera. In the present exemplary embodiment, the image capturing apparatus 10 transmits a still image as an image to the information processing apparatus 30.

The information processing apparatus 30 receives an image signal from the image capturing apparatus 10. An image of the image signal contains a target object (hereinafter, also referred to simply as "object" or as "predetermined object"). In the present exemplary embodiment, the image signal will be referred to as a first image signal. The information processing apparatus 30 determines an object region in the image of the received first image signal. Then, the information processing apparatus 30 generates a similar pixel map on which similarities to luminance values of the object region are mapped in pixel units on a background region. Specifically, the information processing apparatus 30 identifies a region having similar luminance values to the luminance values of the object region from a background region other than the object region. The image (first image signal) that contains the object can be an image selected in advance by a user from images that are previously captured by the image capturing apparatus 10.

If the information processing apparatus 30 receives a second image signal from the image capturing apparatus 10 after the first image signal, the information processing apparatus 30 acquires luminance values (luminance evaluation value) of a region of the second image signal that is identified based on the similar pixel map, and determines an exposure setting (exposure adjustment) so that the luminance evaluation value become a predetermined luminance value. Then, the information processing apparatus 30 transmits an exposure control signal (exposure adjustment signal) for causing the image capturing apparatus 10 to capture an image based on the exposure setting to the image capturing apparatus 10. Since the information processing apparatus 30 transmits the exposure control signal to the image capturing apparatus 10, the information processing apparatus 30 can be referred to as "image capturing control apparatus". The information processing apparatus 30 is, for example, a personal computer, tablet terminal, or smartphone.

<Configurations of Image Capturing Apparatus and Information Processing Apparatus>

Figure 2:
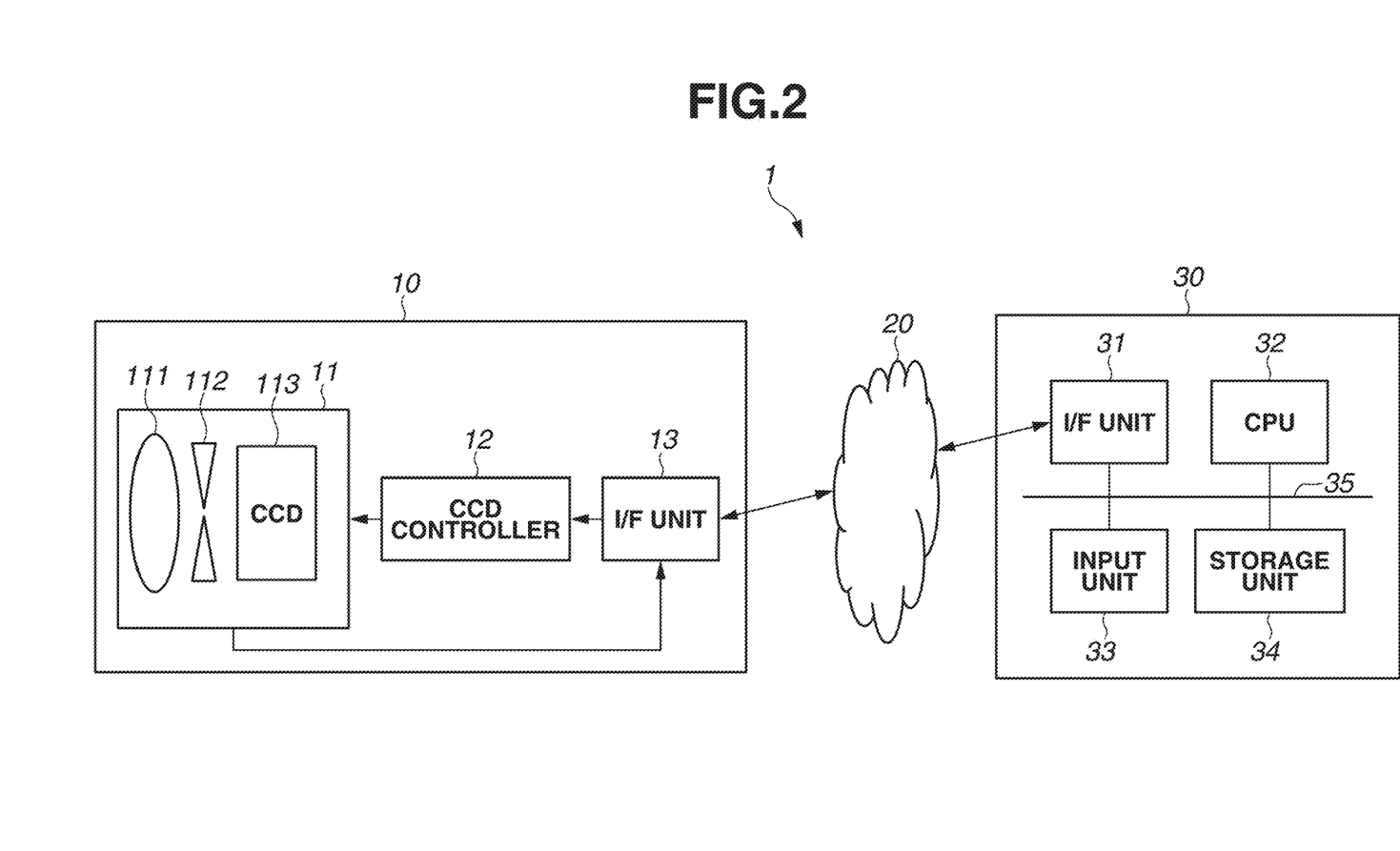
FIG. 2 is a block diagram illustrating configurations of an image capturing apparatus and an information processing apparatus.

FIG. 2 is a block diagram illustrating configurations of the image capturing apparatus 10 and the information processing apparatus 30.

The image capturing apparatus 10 includes an image capturing unit 11, a charge-coupled device (CCD) controller 12, and an interface (I/F) unit 13, as illustrated in FIG. 2. The image capturing unit 11 is connected with the CCD controller 12, and the CCD controller 12 is connected with the I/F unit 13. The I/F unit 13 is connected with the image capturing unit 11 and the network 20.

The image capturing unit 11 includes a lens 111, a diaphragm 112, and a CCD 113. The CCD 113 receives incident light having passed through the lens 111 and the diaphragm 112 and outputs a detection signal based on the incident light.

The CCD controller 12 controls the image capturing unit 11. Specifically, the image capturing unit 11 captures an image under control of the CCD controller 12.

The I/F unit 13 receives the exposure adjustment signal transmitted from the information processing apparatus 30 via the network 20 and transmits the exposure adjustment signal to the CCD controller 12.

The information processing apparatus 30 includes an I/F unit 31, a central processing unit (CPU) 32, an input unit 33, a storage unit 34, and a data bus 35. The I/F unit 31, the CPU 32, the input unit 33, and the storage unit 34 are connected with the data bus 35 and can transmit and receive signals to and from one another.

The I/F unit 31 is connected with the network 20 and receives an image signal from the image capturing apparatus 10. The I/F unit 31 converts the received image signal into image data in a format supported by the camera system 1 and transmits the image data to the storage unit 34 via the data bus 35. The storage unit 34 stores the image data.

The CPU 32 analyzes the image data stored on the storage unit 34 based on a program stored on the storage unit 34. As a result of analyzing the image data, the CPU 32 acquires information such as luminance values in an image capturing field of the image capturing apparatus 10. Then, the CPU 32 transmits the information to the storage unit 34, and the storage unit 34 stores the information.

The input unit 33 includes a keyboard and/or a mouse. A user can input various commands, data, and correspondence tables to the information processing apparatus 30 by operating the input unit 33. In the present exemplary embodiment, the input unit 33 includes a display unit. The user can input a command using a touch panel displayed on the display unit. Further, the user can designate an object candidate region in an image displayed on the display unit. An input unit 33 can also be referred to as "operation unit".

The storage unit 34 is used to store information either temporarily or permanently during execution of processing. For example, the storage unit 34 stores an image transmitted from the image capturing apparatus 10. The storage unit 34 also stores a luminance evaluation value/exposure setting correspondence table that shows a correspondence between luminance evaluation values and exposure settings. The storage unit 34 can also store control parameters for controlling an image capturing direction of the image capturing apparatus 10. The storage unit 34 includes a first storage region, a second storage region, and a third storage region for the respective types of information to be stored.

In a case where a first image is an image that is selected in advance (prepared) by a user, the first image is stored on the storage unit 34.

Further, the storage unit 34 can be used as a storage region for various parameters and programs to be executed by the CPU 32 and as a work area during execution of a program. The storage unit 34 is a storage medium such as a read-only memory (ROM), random access memory (RAM), hard disk drive (HDD), flash memory, or removable secure digital card (removable SD card).

The image capturing apparatus 10 and the information processing apparatus 30 can further include a component other than those illustrated in FIG. 2. For example, the image capturing apparatus 10 can include a display unit, a sound acquisition unit, and a pan-tilt-zoom driving unit. Further, the information processing apparatus 30 can include an audio output unit.

<Processing by Information Processing Apparatus>

Figure 3:
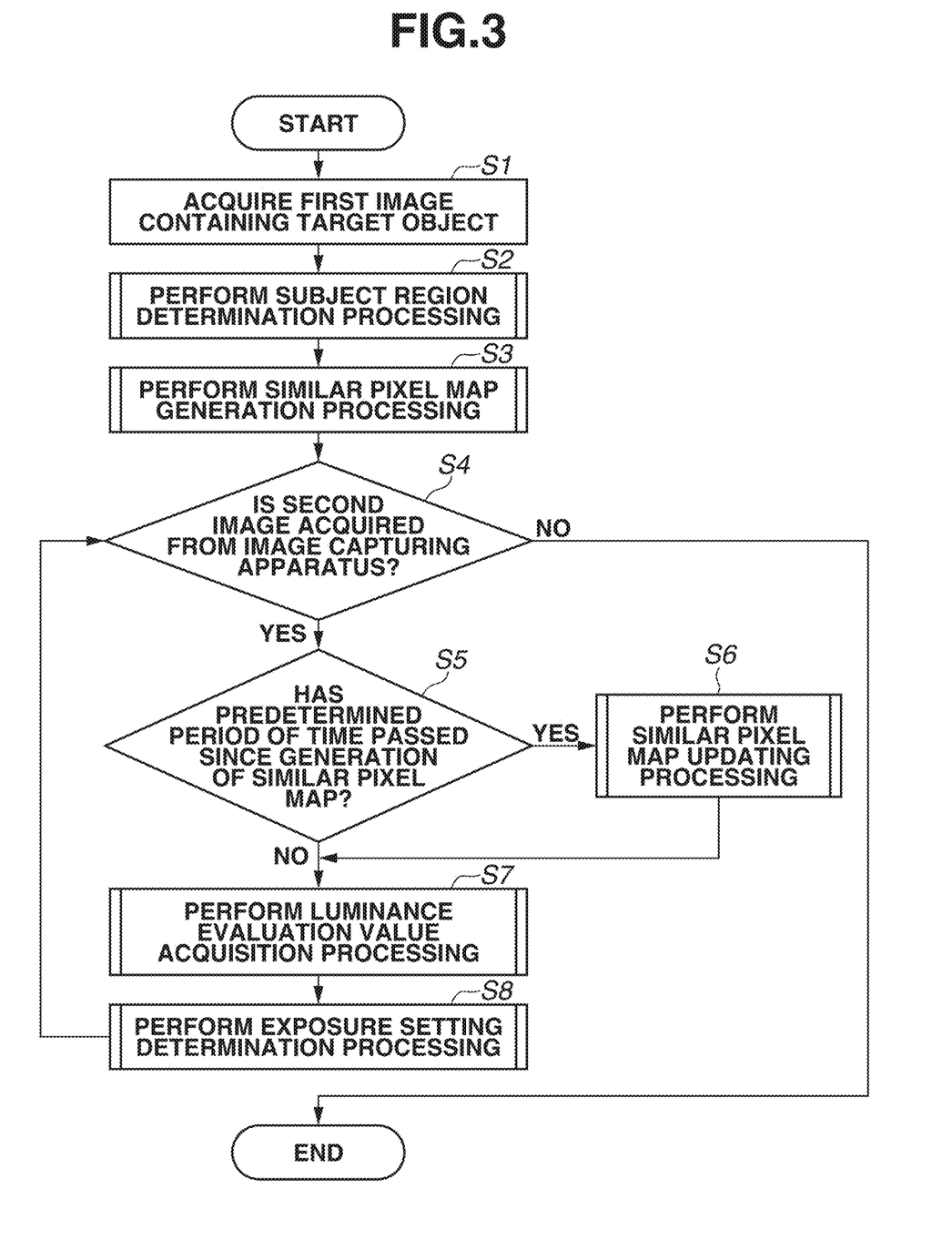
FIG. 3 is a flowchart illustrating an entire process performed in the information processing apparatus according to a first exemplary embodiment.

A process performed in the information processing apparatus 30 will be described below with reference to FIGS. 3 and 4A to 4G. FIG. 3 is a flowchart illustrating an entire process performed in the information processing apparatus 30. Images illustrated in FIGS. 4A to 4G are examples of processing results that are acquired as a result of processing illustrated in FIG. 3. The CPU 32 reads a program from the storage unit 34 and executes the read program to thereby perform the process illustrated in FIG. 3.

Figure 4A:
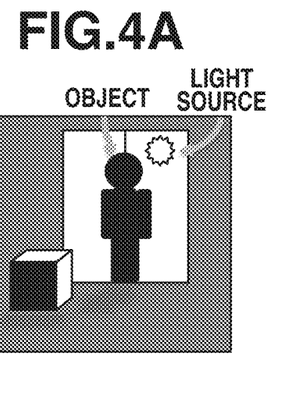
FIGS. 4A to 4G illustrate processing results in FIG. 3.

In step S1, the information processing apparatus 30 acquires a first image containing a predetermined object. The image in FIG. 4A is an example of the first image. In the image in FIG. 4A, a light source is, for example, the sun, and the object is a person. The person stands in front of two pieces of transparent glass. The front of the person is the inside of a room, and there is no light in the room. The image capturing apparatus 10 captures an image of the person from the inside of the room. At the left front of the person is a cubic object. Specifically, the image capturing apparatus 10 captures an image of the person against the sun. When viewed from the light source, a rear surface of the cubic object is not irradiated with the light source, so that the rear surface of the cubic object is illustrated in black. A wall and floor in the room are illustrated in a color that is slightly lighter than black due to the light from the light source.

Figure 4B:
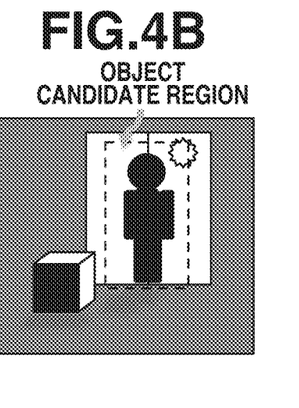
Figure 4C:
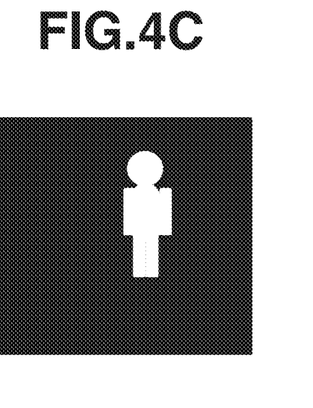

In step S2, the information processing apparatus 30 sets an object candidate region in the first image based on an object candidate region designated (set) by a user using the input unit 33. The image in FIG. 4B is an example of an object candidate region. In the image in FIG. 4B, a rectangular region specified by a broken line is an object candidate region. When designating an object candidate region, the user sets the object candidate region so that the object candidate region contains the object. Then, the information processing apparatus 30 determines an object region in the object candidate region. The image in FIG. 4C is an example of an object region. In the image in FIG. 4C, an outline shape is an object region. The object region determination processing will be described below with reference to FIG. 5.

Figure 4D:
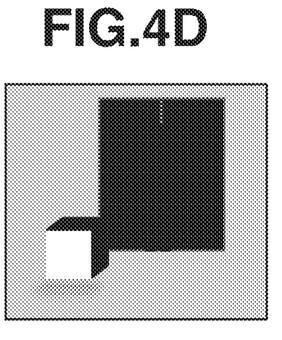

In step S3, the information processing apparatus 30 generates a similar pixel map by mapping similarities to luminance values of the object region determined in step S2 in pixel units on a background region other than the object region. The image in FIG. 4D is an example of a similar pixel map. The object region is a white region in the image in FIG. 4C. In the background region other than the object region, a region that has similar luminance values to the luminance values of the object are the rear surface of the cubic object. In the image in FIG. 4D, regions having higher similarities are closer to white. For example, the region of the rear surface of the cubic object is illustrated in white because the region has a high similarity. The region having the most different luminance information (luminance value) from that of the object is the transparent glass portion, so that the transparent glass portion is illustrated in black (similarity is low) in the image in FIG. 4D. The wall and floor in the room are illustrated in gray. In the image in FIG. 4D, the object region is illustrated in black. In the present exemplary embodiment, the luminance evaluation value is extracted from a white region having a high similarity. The similar pixel map generation processing will be described below with reference to FIG. 6. The similar pixel map in FIG. 4D illustrates a state before binarization.

Figure 4E:
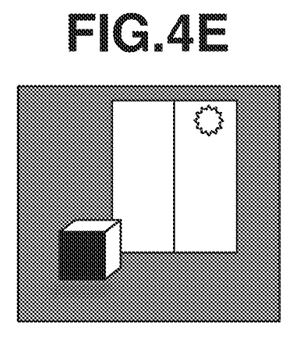

In step S4, the information processing apparatus 30 determines whether a new image (second image) is acquired from the image capturing apparatus 10. In a case where the information processing apparatus 30 determines that a new image is acquired (YES in step S4), the processing proceeds to step S5. The image in FIG. 4E is an example of a second image. The person is not in the image in FIG. 4E. The present exemplary embodiment considers a case where the person moves outside of the image capturing range after the image capturing apparatus 10 captures the first image, and the image capturing apparatus 10 captures a second image. On the other hand, in a case where the information processing apparatus 30 determines that a new image is not acquired (NO in step S4), the process is ended.

In step S5, the information processing apparatus 30 determines whether a predetermined period of time has passed since the generation of the last similar pixel map. In a case where the information processing apparatus 30 determines that the predetermined period of time has passed since the generation of the last similar pixel map (YES in step S5), the processing proceeds to step S6. On the other hand, in a case where the information processing apparatus 30 determines that the predetermined period of time has not passed since the generation of the last similar pixel map (NO in step S5), the processing proceeds to step S7.

In step S6, the information processing apparatus 30 updates the similar pixel map. Specifically, the information processing apparatus 30 acquires a new first image from the image capturing apparatus 10 and generates a new similar pixel map from the first image. The similar pixel map updating processing will be described below with reference to FIG. 9. In the present exemplary embodiment, in a case where the information processing apparatus 30 determines that the predetermined period of time has passed since the generation of the last similar pixel map in step S5, in one embodiment, the currently-used similar pixel map is not used, so that the similar pixel map is updated in step S6. For example, if the predetermined period of time passes, the position of the light source (sun) changes, and the brightness in the image capturing range of the image capturing apparatus 10 changes, so that the similar pixel map is updated.

In step S7, the luminance evaluation value is acquired based on the second image acquired in step S4 and the similar pixel map acquired in step S3 or the similar pixel map updated in step S6. The luminance evaluation value acquisition processing will be described below with reference to FIG. 7.

Figure 4F:
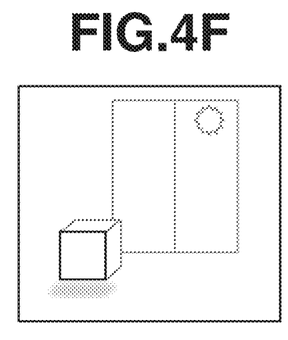

In step S8, the information processing apparatus 30 acquires (determines) the most suitable exposure setting based on the luminance evaluation value acquired in step S7 and transmits an exposure adjustment signal corresponding to the determined exposure setting to the image capturing apparatus 10. An image captured by the image capturing apparatus 10 after the exposure adjustment in step S8 is, for example, as illustrated in FIG. 4F. Thus, an image of the object is captured using the suitable exposure. The exposure setting determination processing will be described below with reference to FIG. 8.

Figure 4G:
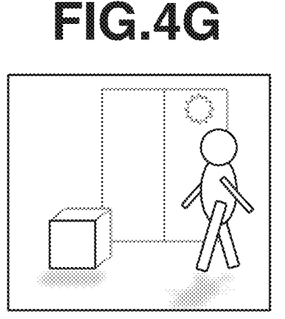

In the present exemplary embodiment, after step S8, the processing returns to step S4, and steps S4 to S8 are repeated until no image is acquired from the image capturing apparatus 10. For example, in a case where a person comes into a region near the designated object region in the first image after the image illustrated in FIG. 4F is captured, an image as illustrated in FIG. 4G is captured. Even in this case, an image of the person (object) is captured using the suitable exposure. From the image as illustrated in FIG. 4G, it is not difficult to identify and recognize the face of the person that is the object.

Details of the processing illustrated in FIG. 3 will be described below.

<Object Region Determination Processing>

Figure 5:
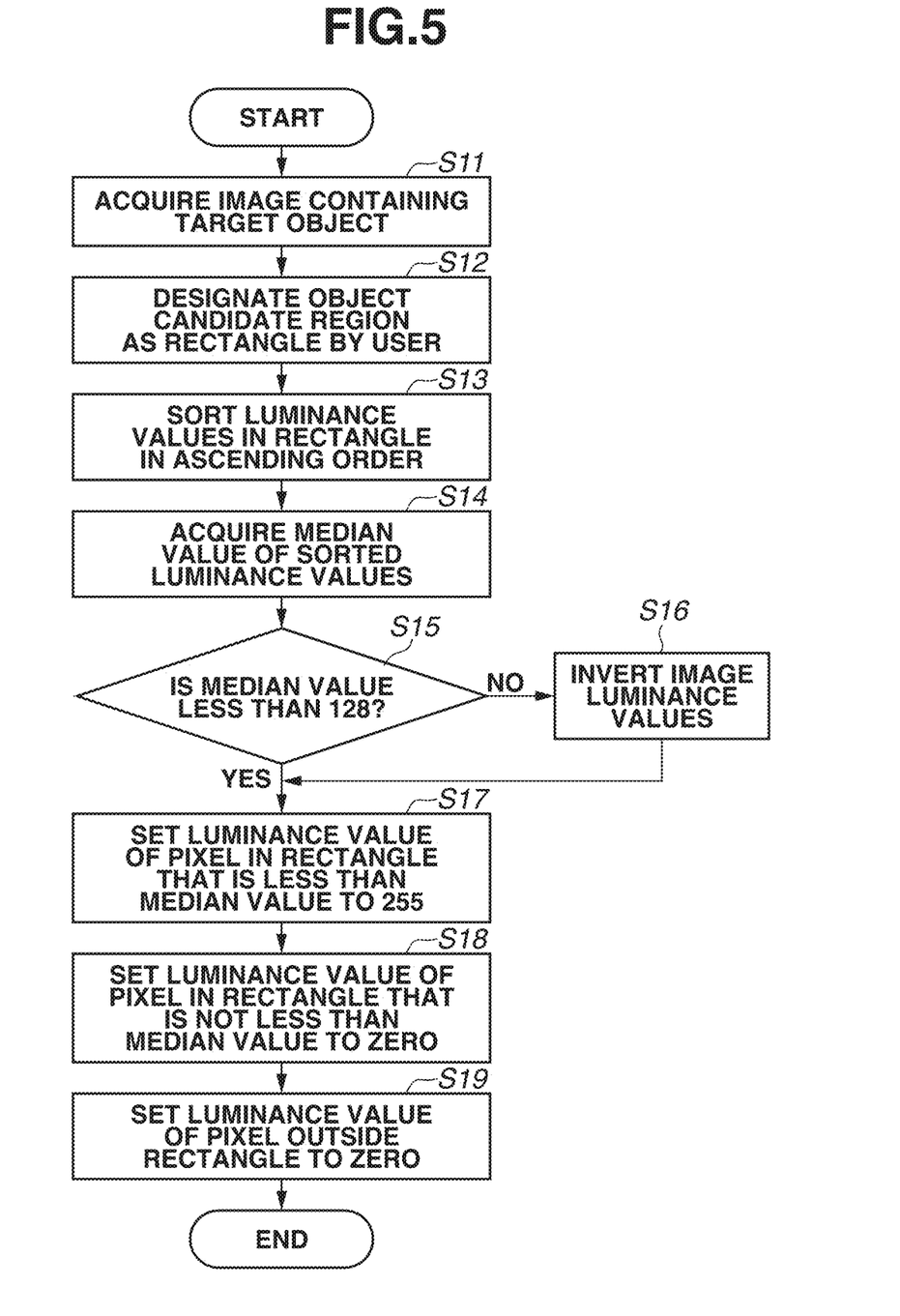
FIG. 5 is a flowchart illustrating a process of determining an object region that is performed in the information processing apparatus according to the first exemplary embodiment.

FIG. 5 is a flowchart illustrating details of the processing in step S2 in FIG. 3 and illustrates details of the object region determination processing performed in the information processing apparatus 30.

In step S11, the information processing apparatus 30 acquires an image (first image) containing an object for which an exposure is to be adjusted.

In step S12, the user designates an object candidate region in the shape of a rectangle in the image acquired in step S11 using the input unit 33. The information processing apparatus 30 sets an object candidate region in the image based on the user-designated object candidate region.

In step S13, the information processing apparatus 30 acquires a luminance value list by aligning the luminance values in the rectangle and sorting the luminance values in ascending order.

In step S14, the information processing apparatus 30 acquires a median value of the luminance values from the luminance value list. In step S15, the information processing apparatus 30 determines whether the median value acquired in step S14 is less than a midpoint (the midpoint is 128 because there are 256 gradations) of a range of possible values of the luminance values. In a case where the information processing apparatus 30 determines that the median value is less than the midpoint (YES in step S15), the processing proceeds to step S17. On the other hand, in a case where the information processing apparatus 30 determines that the median value is not less than the midpoint (NO in step S15), the processing proceeds to step S16.

In step S16, the information processing apparatus 30 subtracts a luminance value of each pixel of the image acquired in step S11 from a maximum value (the maximum value is 255 because there are 256 gradations) of the range of possible values of the luminance values and inverts the luminance values.

In the case where the processing proceeds to step S17 via step S16, the information processing apparatus 30 uses the image acquired in step S16, and if a luminance value of each pixel in the rectangle designated in step S12 is less than the median value acquired in step S14, the information processing apparatus 30 replaces the luminance value with the maximum value (255). On the other hand, in the case where the processing proceeds not via step S16 but directly to step S17, the information processing apparatus 30 uses the image acquired in step S11, and if a luminance value of each pixel in the rectangle designated in step S12 is less than the median value acquired in step S14, the information processing apparatus 30 replaces the luminance value with the maximum value (255).

In step S18, if a luminance value of a pixel in the rectangle designated in step S12 in the image acquired in step S17 is not less than the median value acquired in step S14, the information processing apparatus 30 replaces the luminance value of the pixel with a minimum value (the minimum value is 0 because where are 256 gradations).

In step S19, the information processing apparatus 30 replaces a luminance value of each pixel outside the rectangle designated in step S12 in the image acquired in step S18 with a minimum value (0) of the luminance values.

As a result of the processing in steps S11 to S19, an object region mask image (image corresponding to the object region in the image in FIG. 4C) in which the luminance values of the pixels of the object region are each the maximum value (255) of the luminance value range whereas the luminance values of the pixels of the region other than the object region are each the minimum value (0) of the luminance value range is acquired.

The object region determination method illustrated in FIG. 5 is a mere example, and a method is not limited to the method illustrated in FIG. 5. For example, an object region detected using a publicly-known object region detection algorithm can be employed as an object region for use in the present exemplary embodiment.

Figure 6:
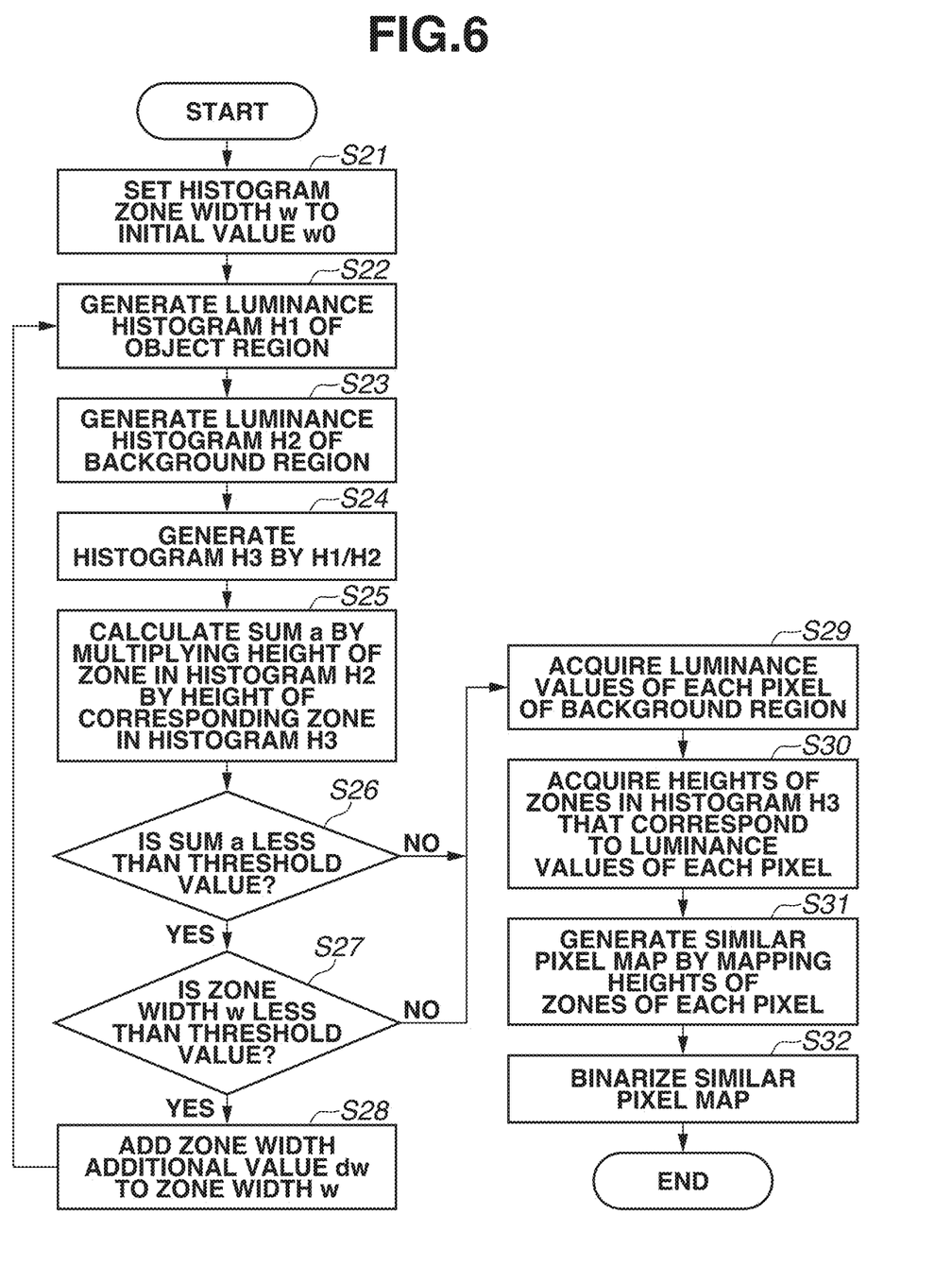
FIG. 6 is a flowchart illustrating a process of generating a similar pixel map that is performed in the information processing apparatus according to the first exemplary embodiment.

FIG. 6 is a flowchart illustrating details of the processing in step S3 in FIG. 2 and illustrates details of the similar pixel map generation processing performed in the information processing apparatus 30. In the present exemplary embodiment, a luminance histogram is used in generating a similar pixel map.

In step S21, the information processing apparatus 30 sets a zone width w for use in a luminance histogram for use in generating a similar pixel map to an initial zone width value wo.

In step S22, the information processing apparatus 30 generates a histogram H1 of the zone width w based on the luminance values of the object region acquired in step S2.

In step S23, the information processing apparatus 30 generates a histogram H2 of the zone width w based on the luminance values of the background region other than the object region.

In step S24, the information processing apparatus 30 acquires a histogram H3 by dividing respective zones of the histogram H1 acquired in step S22 by respective zones of the histogram H2 acquired in step S23. In step S25, the information processing apparatus 30 calculates a sum (total) a as an index for determining whether there is an adequate similar pixel map for the background region. The sum a is calculated by multiplying the height of a zone of the histogram H2 acquired in step S23 by the height of the corresponding zone in the histogram H3 acquired in step S24.

In step S26, the information processing apparatus 30 determines whether the sum a acquired in step S25 is less than a threshold value. Specifically, in step S26, the information processing apparatus 30 determines whether the total of the luminance similarities specified by the luminance histogram of the background region is less than the predetermined value. In a case where the information processing apparatus 30 determines that the sum a is less than the threshold value (YES in step S26), the processing proceeds to step S27. On the other hand, in a case where the information processing apparatus 30 determines that the sum a is not less than the threshold value (NO in step S26), the processing proceeds to step S29.

In step S27, the information processing apparatus 30 determines whether the zone width w is less than a threshold value. In a case where the information processing apparatus 30 determines that the zone width w is less than the threshold value (YES in step S27), the processing proceeds to step S28. On the other hand, in a case where the information processing apparatus 30 determines that the zone width w is not less than the threshold value (NO in step S27), the processing proceeds to step S29.

In step S28, the information processing apparatus 30 adds a zone width additional value dw to the zone width w. Specifically, in the case where the total of the luminance similarities specified by the luminance histogram of the background region is less than the predetermined value, the zone width of the luminance histogram is increased. After step S28, the processing returns to step S22.

In step S29, the information processing apparatus 30 acquires the luminance values of the respective pixels of the background region of the image.

In step S30, the information processing apparatus 30 determines a corresponding zone in the histogram H3 with respect to the luminance value of each pixel acquired in step S29 and acquires the height value of the zone.

In step S31, the information processing apparatus 30 generates a similar pixel map by mapping the zone height values of the pixels that are acquired in step S30 on the corresponding pixels.

In step S32, the information processing apparatus 30 binarizes the similar pixel map. As a result of the binarization, the similar pixel map includes a region of 1 and a region of 0 (true value region and false value region).

Step S32 is not essential, and any processing of identifying a region having a high similarity can be employed. For example, a similar pixel map as illustrated in FIG. 4D can be used directly in the luminance evaluation value acquisition processing (step S7) without binarization.

Further, the similar pixel map generation method in FIG. 6 is a mere example, and a method is not limited to the method illustrated in FIG. 6. For example, a similar pixel map can be generated by setting the median value of the luminance values in the object region of the first image as a representative luminance value, determining luminance values in the background region that are within a predetermined range having the representative luminance value as its center, and inputting "true" to each corresponding pixel and "false" to each non-corresponding pixel.

<Luminance Evaluation Value Acquisition Processing>

Figure 7:
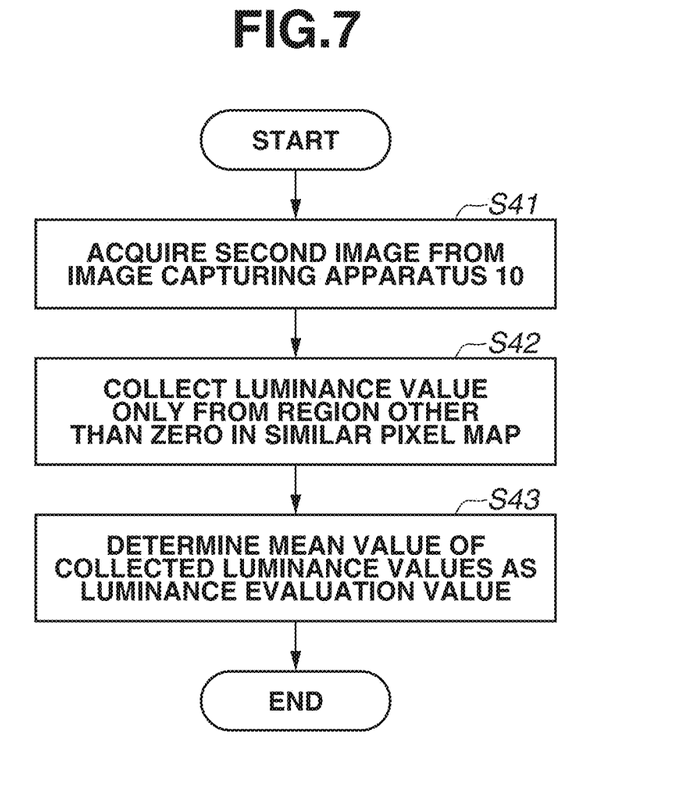
FIG. 7 is a flowchart illustrating a process of acquiring a luminance evaluation value that is performed in the information processing apparatus according to the first exemplary embodiment.

FIG. 7 is a flowchart illustrating details of the processing in step S7 in FIG. 3 and illustrates details of the luminance evaluation value acquisition processing performed in the information processing apparatus 30.

In step S41, the information processing apparatus 30 acquires the second image from the image capturing apparatus 10.

In step S42, the information processing apparatus 30 collects a luminance value from the second image only for the regions of the true value in the similar pixel map acquired in step S3 or S6 (i.e., only for the regions other than 0).

In step S43, the information processing apparatus 30 calculates a mean value of the luminance values collected in step S42 and determines the mean value as a luminance evaluation value.

The luminance evaluation value acquisition processing in FIG. 7 is a mere example, and a method is not limited to the method illustrated in FIG. 7. For example, a weighted average luminance value of the second image that is calculated using the luminance values of the pixels of the similar pixel map as weights can be determined as a luminance evaluation value.

<Exposure Setting Determination Processing>

Figure 8:
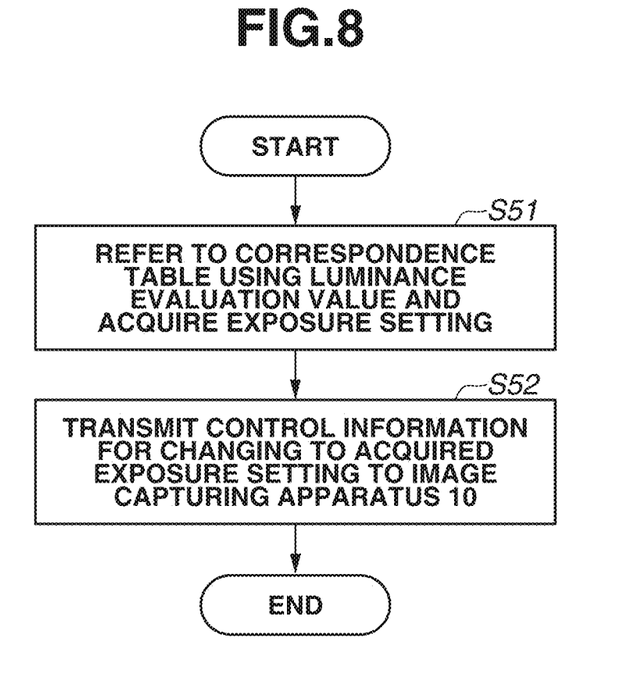
FIG. 8 is a flowchart illustrating a process of determining an exposure setting that is performed in the information processing apparatus according to the first exemplary embodiment.

FIG. 8 is a flowchart illustrating details of the processing in step S8 in FIG. 2 and illustrates details of the exposure setting determination processing performed in the information processing apparatus 30.

In step S51, the information processing apparatus 30 refers to the luminance evaluation value/exposure setting correspondence table stored on the storage unit 34 using the luminance evaluation value acquired in step S7 and acquires the corresponding exposure setting.

In step S52, the information processing apparatus 30 transmits the exposure setting acquired in step S51 as an exposure control signal to the image capturing apparatus 10. The image capturing apparatus 10 sets (determines, changes) the exposure setting based on the received exposure control signal.

The above-described exposure setting determination processing is a mere example, and any other method can be used to determine the exposure setting. For example, the exposure setting can be repetitively changed until the luminance evaluation value becomes the predetermined luminance value.

<Similar Pixel Map Updating Processing>

Figure 9:
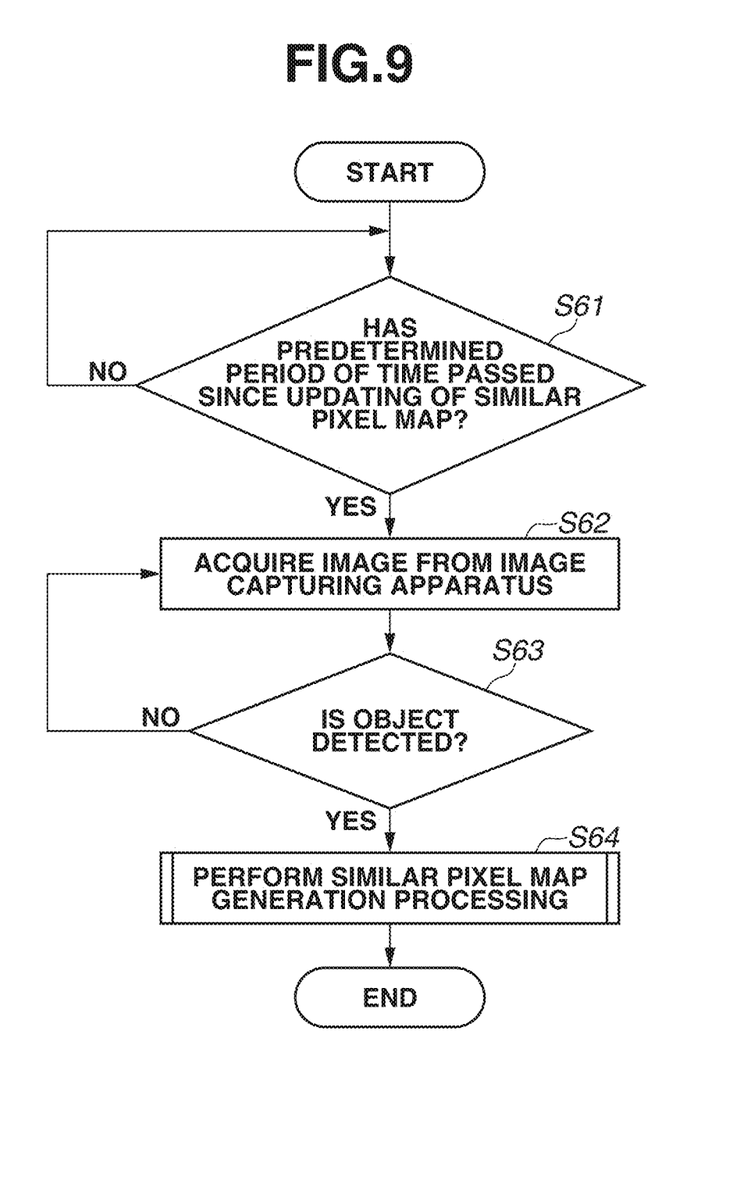
FIG. 9 is a flowchart illustrating a process of updating a similar pixel map that is performed in the information processing apparatus according to the first exemplary embodiment.

FIG. 9 is a flowchart illustrating details of the processing in step S6 in FIG. 2 and illustrates details of the similar pixel map updating processing performed in the information processing apparatus 30.

In step S61, the information processing apparatus 30 determines whether a predetermined period of time has passed since the last updating of the similar pixel map. The predetermined period of time is, for example, 10 minutes. In a case where the information processing apparatus 30 determines that the predetermined period of time has passed (YES in step S61), the processing proceeds to step S62. On the other hand, in a case where the information processing apparatus 30 determines that the predetermined period of time has not passed (NO in step S61), the processing returns to step S61.

In step S62, the information processing apparatus 30 acquires a captured image from the image capturing apparatus 10. In step S62, the image that contains the object is received and acquired from the image capturing apparatus 10, so that it can be said that the processing in FIG. 9 acquires a new first image at every predetermined time interval from the image capturing apparatus 10.

In step S63, the information processing apparatus 30 determines whether the object is detected from the image acquired in step S62. In a case where the information processing apparatus 30 determines that the object is detected (YES in step S63), the processing proceeds to step S64. On the other hand, in a case where the information processing apparatus 30 determines that the object is not detected (NO in step S63), the processing returns to step S62, and a new captured image is acquired.

In step S64, the information processing apparatus 30 performs the similar pixel map generation processing in step S3. Specifically, in step S64, the similar pixel map for use in the luminance evaluation value acquisition processing in step S7 is updated.

As described above, the camera system 1 according to the present exemplary embodiment adjusts the exposure as suitable for an object regardless of whether a target object (object) is detected. Thus, an image of the object is promptly captured with a suitable exposure, compared to a method of changing an exposure setting for each captured image, and the possibility of missing an opportunity to capture an image of the object is reduced. With the present exemplary embodiment, the similar pixel map is updated so that even when the position or brightness of a light source is changed, the exposure is adjusted as suitable for capturing an image of the object.

Second Exemplary Embodiment

In the first exemplary embodiment, the example in which the similar pixel map is generated from one single first image. There is, however, a case where a moving object region, such as trees moved by wind, in a background region incidentally has a similar luminance value to a luminance value of an object region at the time of generating a similar pixel map from one image. In this case, the similarity between the luminance value of the object region in the first image and the luminance value of the moving object region may not be retained in a second image. Thus, there is a possibility that the exposure cannot be adjusted as suitable for the second image. In order to reduce the possibility, in a second exemplary embodiment, a moving image containing a target object is used, and similar pixel maps of frame images that constitute the moving image are averaged, and the averaged similar pixel map is used. In the descriptions of the present exemplary embodiment, a similar component or processing to that in the first exemplary embodiment is given the same reference numeral, and descriptions thereof are sometimes omitted.

<Configurations of Camera System, Image Capturing Apparatus, and Information Processing Apparatus>

Configurations of the camera system 1, the image capturing apparatus 10, and the information processing apparatus 30 according to the second exemplary embodiment are similar to those according to the first exemplary embodiment illustrated in FIGS. 1 and 2, so that descriptions thereof will be omitted.

<Processing by Information Processing Apparatus>

Figure 10:
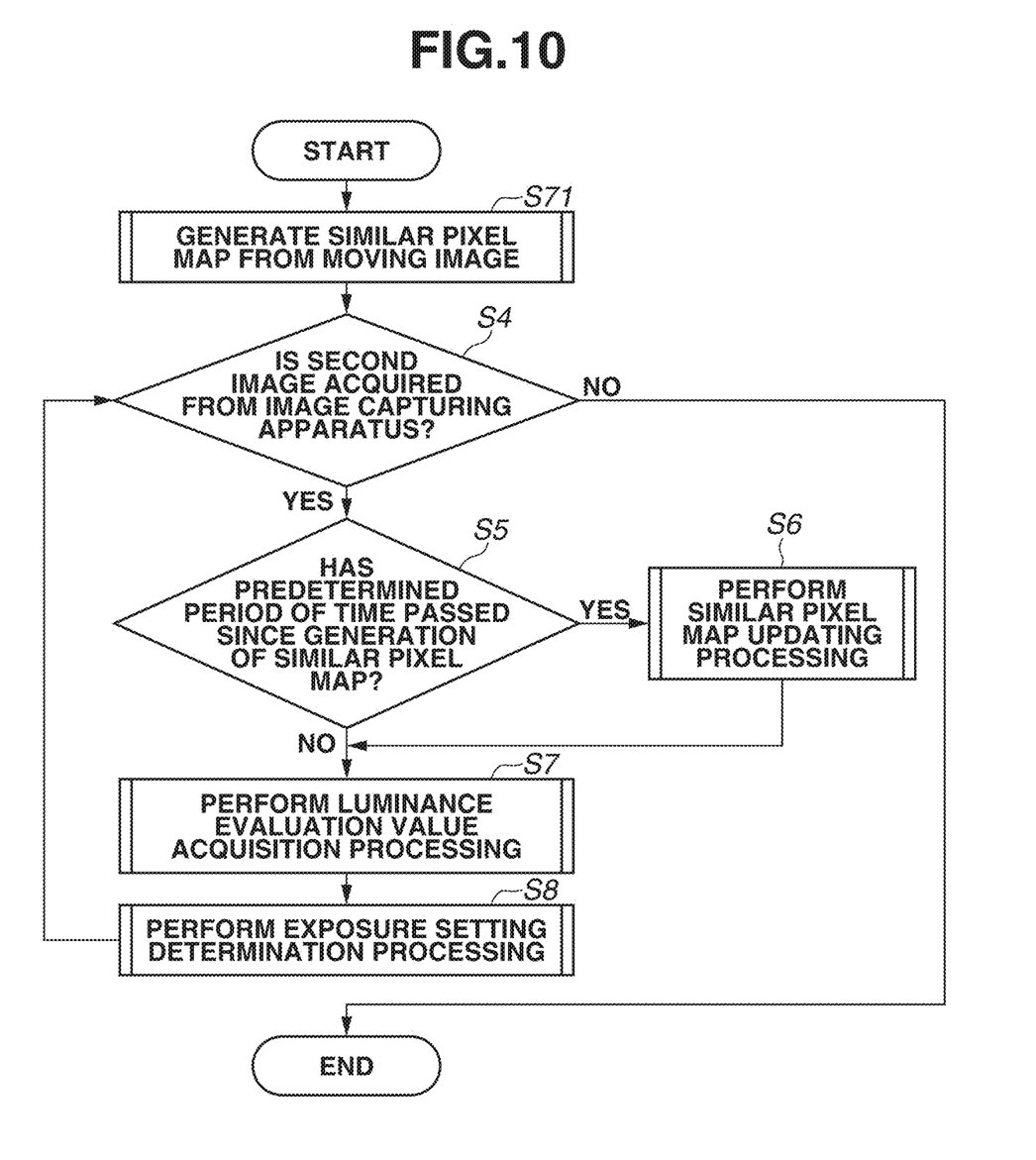
FIG. 10 is a flowchart illustrating an entire process that is performed in an information processing apparatus according to a second exemplary embodiment.

FIG. 10 is a flowchart illustrating an entire process that is performed in the information processing apparatus 30 according to the second exemplary embodiment.

In step S71, the information processing apparatus 30 generates a similar pixel map from a moving image consisting of a plurality of frames. Details of step S71 will be described below with reference to FIG. 11. After step S71, the processing proceeds to step S4.

Steps S4 to S8 in FIG. 10 are similar to those in FIG. 3, so that descriptions thereof are omitted.

Figure 11:
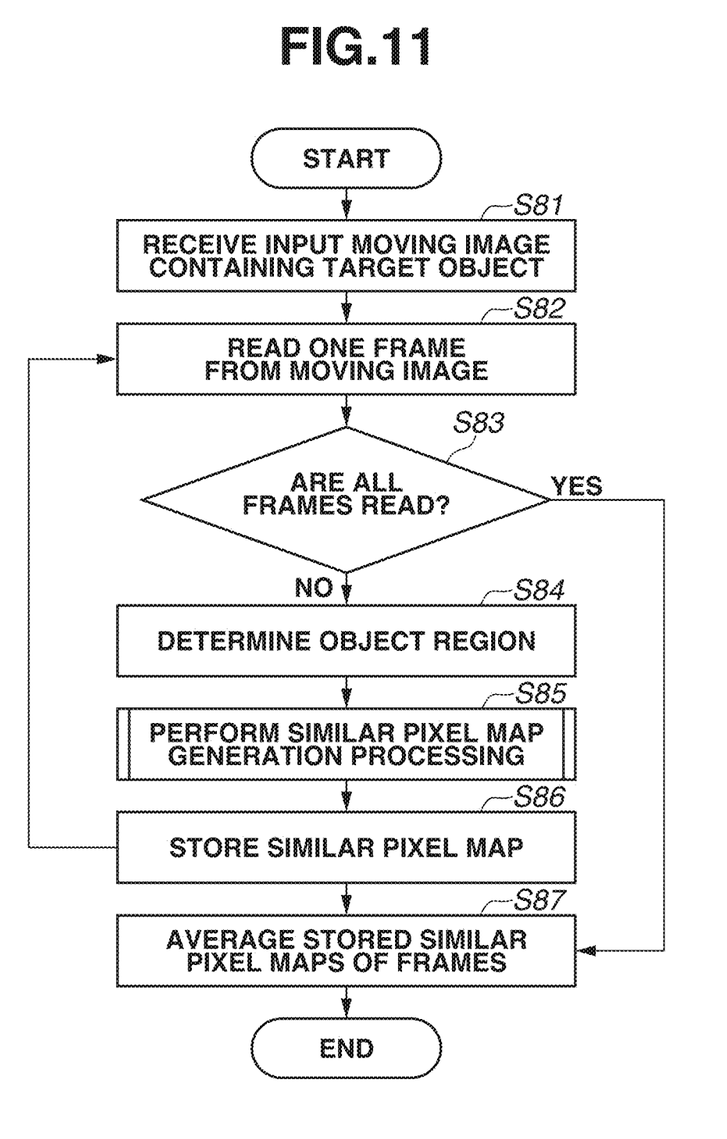
FIG. 11 is a flowchart illustrating a process of generating a similar pixel map that is performed in the information processing apparatus according to the second exemplary embodiment.

A process of generating a similar pixel map from a moving image will be described below with reference to FIG. 11.

In step S81, the information processing apparatus 30 receives an input moving image containing a target object from the image capturing apparatus 10. Specifically, the information processing apparatus 30 receives the moving image containing the object from the image capturing apparatus 10 and stores the received moving image in, for example, the first storage region of the storage unit 34.

In step S82, the information processing apparatus 30 acquires frame images of the moving image one by one. The moving image is read from the first storage region of the storage unit 34 and stored (read) in the second storage region of the storage unit 34 by the CPU 32 whereby the frame images are acquired.

In step S83, the information processing apparatus 30 determines whether all the frame images have been read from the first storage region of the storage unit 34. In a case where the information processing apparatus 30 determines that all the frame images have been read from the first storage region (YES in step S83), the processing proceeds to step S87. Specifically, in a case where all the frame images have been read into the second storage region of the storage unit 34, the processing proceeds to step S87. On the other hand, in a case where the information processing apparatus 30 determines that not all the frame images have been read from the first storage region (NO in step S83), the processing proceeds to step S84.

In step S84, the information processing apparatus 30 determines an object region from the frame images read in step S82 by a publicly-known object region detection method. Alternatively, the user can designate an object region as in the first exemplary embodiment.

In step S85, the information processing apparatus 30 performs the similar pixel map generation processing as in step S3.

In step S86, the information processing apparatus 30 stores the similar pixel map generated in step S85 in the third storage region of the storage unit 34. After step S86, the processing returns to step S82.

In step S82, the information processing apparatus 30 acquires (reads) a next frame image from the first storage region. Steps S82 to S86 are repeated until all the frame images are read from the first storage region of the storage unit 34. Then, when all the frame images are read from the first storage region of the storage unit 34, the information processing apparatus 30 determines that all the frame images are read from the first storage region (YES in step S83), so that the processing proceeds to step S87. By the time the information processing apparatus 30 determines that all the frame images are read from the first storage region (YES in step S83), a plurality of similar pixel maps is stored in the third storage region of the storage unit 34.

In step S87, the information processing apparatus 30 averages the similarities of the pixels of the plurality of similar pixel maps corresponding to the plurality of frames for each pixel and generates a single similar pixel map.

Benefits of Second Exemplary Embodiment

As described above, the camera system 1 according to the second exemplary embodiment allows prompt adjustment of the exposure as suitable for the object, and the possibility of missing an opportunity to capture an image of the object is reduced as in the first exemplary embodiment. Furthermore, the camera system 1 according to the second exemplary embodiment is less likely to determine that the similarity between a luminance value of a moving object region, such as trees moved by wind, in a background region and a luminance value of an object region is high. Thus, the camera system 1 according to the second exemplary embodiment adjusts the exposure more accurately than the first exemplary embodiment.

While the information processing apparatus 30 receives the moving image from the image capturing apparatus 10 and averages the similar pixel maps using the moving image, the information processing apparatus 30 can be configured to receive a plurality of still images (first images) from the image capturing apparatus 10 and generate a plurality of similar pixel maps and average the plurality of similar pixel maps. Further, the processing of step S84 in FIG. 11 can be similar to the processing of step S2 in FIG. 3.

While one network 20 is illustrated in FIGS. 1 and 2, the image capturing apparatus 10 and the information processing apparatus 30 can be connected via a plurality of networks.

While the information processing apparatus 30 and the image capturing apparatus 10 are illustrated as separate apparatuses in FIGS. 1 and 2, the information processing apparatus 30 can be embedded in the image capturing apparatus 10. In this case, the image capturing apparatus 10 is an image capturing apparatus that includes the functions of the information processing apparatus 30, and the information processing apparatus transmits position/size information about a user-designated object region in a first image to the image capturing apparatus 10.

Further, even when an object in a second image is in the vicinity of an object region in a first image as illustrated in the image in FIG. 4G, the exposure is controlled as suitable for the object.

The configurations of the image capturing apparatus 10 and the information processing apparatus 30 illustrated in FIG. 2 are mere examples, and part of the functional modules can also be implemented by hardware. To implement part of the functional modules by hardware, for example, a predetermined compiler can be used to automatically generate a dedicated circuit on a field programmable gate array (FPGA) based on a program for implementing the functions of the functional modules. Alternatively, part of the functional modules can be implemented as hardware by forming a gate array circuit as in the case of the FPGA. Alternatively, part of the functional modules can be implemented by an application-specific integrated circuit (ASIC).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-168252, filed Sep. 17, 2019, which is hereby incorporated by reference herein in its entirety.

What is claimed is:

1. An apparatus configured to control an exposure of a capturing unit, the apparatus comprising:
    an obtaining unit configured to obtain a first image in which a specific object is included and a second image in which the specific object is not included, the second image being obtained after the first image is obtained;
    a determination unit configured to determine an object region corresponding to the specific object in the first image;
    an acquisition unit configured to acquire a region having a similar luminance value to a luminance value of the determined object region in the first image; and
    an adjustment unit configured to adjust the exposure of the capturing unit based on a luminance value of a region corresponding to the acquired region, in the second image.

2. The apparatus according to claim 1, wherein the acquisition unit acquires the region having a similar luminance value based on a luminance histogram of the determined object region and a luminance histogram of the region other than the object region.

3. The apparatus according to claim 2, wherein, in a case where a total luminance similarity indicated by the luminance histogram of the region other than the object region is less than a predetermined value, the acquisition unit increases a zone width of the luminance histogram.

4. The apparatus according to claim 1, wherein, in a case where the obtaining unit obtains a moving image with the specific object, the acquisition unit acquires the region having a similar luminance value by averaging a similarity of a background region of each of a plurality of frame images of the moving image with respect to the luminance value of the object region.

5. The apparatus according to claim 1, wherein the obtaining unit obtains the first image with the specific object at every predetermined time interval.

6. The apparatus according to claim 1, wherein the adjustment unit adjusts the exposure until the luminance after the adjustment becomes a predetermined luminance.

7. The apparatus according to claim 1, wherein the acquisition unit acquires the region having a similar luminance value based on a luminance value of each pixel of the first image.

8. An image capturing apparatus comprising:
    the apparatus according to claim 1; and
    an exposure capturing unit of which is controlled by the apparatus.

9. A method for controlling an exposure of a capturing unit, the method comprising:
    obtaining a first image in which a specific object is included and a second image in which the specific object is not included, the second image being obtained after the first image is obtained;
    determining an object region corresponding to the specific object in the first image;

acquiring a region having a similar luminance value to a luminance value of the determined object region in the first image; and adjusting the exposure of the capturing unit based on the luminance value of a region in corresponding to the acquired region, in the second image.

10. The method according to claim 9, wherein the acquiring acquires the region having a similar luminance value based on a luminance histogram of the determined object region and a luminance histogram of the region other than the object region.

11. The method according to claim 9, wherein, in a case where the obtaining obtains a moving image with the specific object, the acquiring acquires the region having a similar luminance value by averaging a similarity of a background region of each of a plurality of frame images of the moving image with respect to the luminance value of the object region.

12. The method according to claim 9, wherein the obtaining obtains the first image the specific object at every predetermined time interval.

13. The method according to claim 9, wherein the adjusting adjusts the exposure until the luminance after the adjustment becomes a predetermined luminance.

14. The method according to claim 9, wherein the acquiring acquires the region having a similar luminance value based on a luminance value of each pixel of the first image.

15. A non-transitory computer-readable memory storing a program for executing a method for controlling an exposure of a capturing unit, the method comprising:

obtaining a first image in which a specific object is included and a second image in which the specific object is not included, the second image being obtained after the first image is obtained;

determining an object region corresponding to the specific object in the first image;

acquiring a region having a similar luminance value to a luminance value of the determined object region in the first image; and adjusting the exposure of the capturing unit based on the luminance value of a region corresponding to the acquired region, in the second image.

16. The non-transitory computer-readable memory according to claim 15, wherein the acquiring acquires the region having a similar luminance value based on a luminance histogram of the determined object region and a luminance histogram of the region other than the object region.

17. The non-transitory computer-readable memory according to claim 15, wherein, in a case where the obtaining obtains a moving image with the specific object, the acquiring acquires the region having a similar luminance value by averaging a similarity of a background region of each of a plurality of frame images of the moving image with respect to the luminance value of the object region.

18. The non-transitory computer-readable memory according to claim 15, wherein the obtaining obtains the first image with the specific object at every predetermined time interval.

19. The non-transitory computer-readable memory according to claim 15, wherein the adjusting adjusts the exposure until the luminance after the adjustment becomes a predetermined luminance.

20. The non-transitory computer-readable memory according to claim 15, wherein the acquiring acquires the region having a similar luminance value based on a luminance value of each pixel of the first image.

* * * * *